United States Patent
Muddukrishna et al.

(10) Patent No.: US 10,710,537 B2
(45) Date of Patent: Jul. 14, 2020

(54) METHOD AND SYSTEM FOR DETECTING AN INCIDENT, ACCIDENT AND/OR SCAM OF A VEHICLE

(71) Applicant: Volvo Car Corporation, Göteborg (SE)

(72) Inventors: Aloka Muddukrishna, Gothenburg (SE); Jesper Nolhage, København (DK); Julia Nilsson, Gothenburg (SE); Magnus Wennberg, Alafors (SE); Mattias Brännström, Gothenburg (SE); Per Landfors, Hisings Backa (SE); Thomas Lindgren, Vessigebro (SE)

(73) Assignee: Volvo Car Corporation, Göteborg (SE)

( * ) Notice: Subject to any disclaimer, the term of this patent is extended or adjusted under 35 U.S.C. 154(b) by 85 days.

(21) Appl. No.: 15/998,773

(22) Filed: Aug. 16, 2018

(65) Prior Publication Data
US 2019/0054880 A1 Feb. 21, 2019

(30) Foreign Application Priority Data
Aug. 18, 2017 (EP) ..................................... 17186794

(51) Int. Cl.
*B60R 21/0136* (2006.01)
*B60R 25/31* (2013.01)
(Continued)

(52) U.S. Cl.
CPC ...... *B60R 21/0136* (2013.01); *B60R 21/0132* (2013.01); *B60R 25/31* (2013.01);
(Continued)

(58) Field of Classification Search
CPC . B60R 21/0136; B60R 21/0132; B60R 25/31; B60R 25/32; B60R 25/34; G07C 5/008; G07C 5/085
(Continued)

(56) References Cited

U.S. PATENT DOCUMENTS 5,680,123 A * 10/1997 Lee .......................... B60Q 1/52
340/937
5,815,093 A 9/1998 Kikinis
(Continued)

FOREIGN PATENT DOCUMENTS

| CN | 204557788 U | 8/2015 |
|---|---|---|
| EP | 1280681 B1 | 3/2004 |
| EP | 2761602 A1 | 8/2014 |

OTHER PUBLICATIONS

May 8, 2018 European Search Report issue on International Application No. EP17186794.8.

*Primary Examiner* — Kam Wan Ma
(74) *Attorney, Agent, or Firm* — Clements Bernard Walker; Christopher L. Bernard

(57) ABSTRACT

A method for collecting and storing vehicle sensor data of at least one sensing system of a vehicle in order to detect an incident, accident and/or scam, said method comprising the steps of: (1) continuously collecting and storing a first set of vehicle sensor data for a preceding first pre-definable time period at least when the vehicle is in motion and/or when a door or trunk of the vehicle is open, (2) collecting and storing a second set of vehicle sensor data for a coming second pre-definable time period when at least one of the following occurs: the vehicle is brought to standstill, the door or trunk of the vehicle is being closed, or the vehicle drives away from standstill after being parked. Furthermore, the present disclosure relates to a corresponding system, computer product and a computer-readable storage medium storing a program which causes a computer to execute the method.

12 Claims, 2 Drawing Sheets

(51) Int. Cl.
*B60R 25/34* (2013.01)
*B60R 21/0132* (2006.01)
*B60R 25/32* (2013.01)
*G07C 5/08* (2006.01)
*G07C 5/00* (2006.01)
*G08B 13/196* (2006.01)
*B60R 21/01* (2006.01)
*G01S 15/88* (2006.01)
*G01S 17/88* (2006.01)
*G01S 13/88* (2006.01)

(52) U.S. Cl.
CPC .............. *B60R 25/32* (2013.01); *B60R 25/34* (2013.01); *G07C 5/008* (2013.01); *G07C 5/085* (2013.01); *G07C 5/0866* (2013.01); *G07C 5/0891* (2013.01); *G08B 13/19647* (2013.01); *B60R 2021/01013* (2013.01); *G01S 13/88* (2013.01); *G01S 15/88* (2013.01); *G01S 17/88* (2013.01); *G08B 13/19669* (2013.01)

(58) Field of Classification Search
USPC .......................................................... 340/436
See application file for complete search history.

(56) References Cited

U.S. PATENT DOCUMENTS

| | | |
|---|---|---|
| 6,141,611 A | 10/2000 | Mackey et al. |
| 6,246,933 B1 | 6/2001 | Bague |
| 8,799,034 B1 | 8/2014 | Brandmaier et al. |
| 9,019,092 B1 | 4/2015 | Brandmaier et al. |
| 9,227,568 B1* | 1/2016 | Hubbell .................. B60R 1/081 |
| 9,327,685 B1* | 5/2016 | Wooten ................ B60R 25/102 |
| 2007/0088488 A1* | 4/2007 | Reeves .................. G07C 5/085 |
| | | 701/117 |
| 2012/0105635 A1 | 5/2012 | Erhardt et al. |
| 2013/0166098 A1 | 6/2013 | Fuchs |
| 2014/0375807 A1* | 12/2014 | Muetzel .................. H04N 7/18 |
| | | 348/148 |
| 2015/0195518 A1 | 7/2015 | Shikii et al. |
| 2015/0356792 A1 | 12/2015 | Dietz et al. |
| 2016/0214535 A1* | 7/2016 | Penilla .................. G06Q 20/18 |
| 2019/0213931 A1* | 7/2019 | Brubaker ................ B60Q 1/44 |

* cited by examiner

METHOD AND SYSTEM FOR DETECTING AN INCIDENT, ACCIDENT AND/OR SCAM OF A VEHICLE

CROSS-REFERENCE TO RELATED APPLICATION

The present patent application/patent claims the benefit of priority of co-pending European Patent Application No. 17186794.8, filed on Aug. 18, 2017, and entitled "METHOD AND SYSTEM FOR DETECTING AN INCIDENT, ACCIDENT AND/OR SCAM OF A VEHICLE," the contents of which are incorporated in full by reference herein.

TECHNICAL FIELD

The present invention relates to vehicles, such as passenger cars, and more particularly to vehicles which comprises at least one sensing system.

According to a first aspect, the invention regards a method for collecting and storing vehicle sensor data of at least one sensing system of a vehicle in order to detect an incident, accident and/or scam.

According to a second aspect, the invention regards a system for collecting and storing vehicle sensor data in order to detect an incident, accident and/or scam.

According to a third aspect, the invention regards computer-readable storage medium storing a program which causes a computer to execute a method according to the first aspect of the invention.

According to a fourth aspect, the invention regards a computer program product comprising a computer readable medium having stored thereon computer program means for collecting and storing vehicle sensor data of a sensing system of a vehicle in order to detect an incident, accident and/or scam.

BACKGROUND OF THE INVENTION

When an incident or accident of a vehicle occurs, it can sometimes be difficult to determine who is responsible for the damage. This is especially true in situations where for instance a passenger car has been damaged when parked, which is a common occurrence when it comes to, e.g., scratches or minor dents. Furthermore, in some countries it happens that vulnerable road users—VRU—such as pedestrians fake an accident in order to claim compensation. Since it can be very difficult to determine who is responsible for the damage in these type of situations it is common that some drivers choose not to report the accident and rather settle the dispute on site and/or pay for the repair themselves. Nonetheless, the troublesome procedure and potential cost that follows upon an incident/accident cause many drivers to worry about the hassle.

In order to prove who is responsible for an incident/accident, many drivers install a so called dashcam in their vehicle which records the front view of the vehicle. If an incident/accident occurs, the video data is used to objectively view the scenario and determine who is responsible for the incident/accident. However, a dashcam is only able to record a front view of the vehicle which is insufficient when it comes to detecting incidents on the sides or the rear of the vehicle. In addition, a dashcam might be inconvenient to install and can occlude the rearview mirror.

Furthermore, a lot of memory to store all video data of the dashcam will be needed if recording everything when the vehicle is moving. Still further, it may be difficult to afterwards find the situation where a possible incident/accident occurred since there will be a lot of stored video data from the dashcam.

Thus, there seems to be room for improvement for detecting possible incidents, accidents and/or scams.

According to its abstract, U.S. Pat. No. 6,246,933 B1 discloses systems for sensing, storing and updating operation parameters, visual conditions and audible conditions for an automotive vehicle which include a plurality of sensors for registering vehicular operation parameters, including at least one vehicle-mounted digital video/audio camera.

EP 1 280 681 B1 discloses a device mounted to an automobile for automatically recording circumstances around the automobile as images with sounds, and also to a device for recording an image of driving circumstances around an automobile, wherein cameras for obtaining images are mounted to the automobile.

According to its abstract, U.S. Pat. No. 5,815,093 A discloses a vehicle accident recording system which employs a digital camera connected to a controller, a non-volatile memory, and an accident-sensing interrupter. The controller accesses images from the digital camera periodically and stores the images in a limited space of n sectors.

SUMMARY OF THE INVENTION

In view of the above-mentioned and other drawbacks of the prior art, an object of the present invention is to provide an improved method and system for detecting an incident, accident and/or scam of a vehicle, such as a passenger car. Still further, an object of the present invention is to provide a method and system for detecting an incident, accident and/or scam of a vehicle which makes it easier to detect possible incidents, accidents and/or scams, and which further is more efficient in terms of energy consumption and cost.

The objects are achieved by the subject matter as specified in the independent claims. Preferred embodiments of the invention can be found in the dependent claims and in the accompanying description.

According to the first aspect thereof, the above-mentioned and other objects are at least partly achieved by a method for collecting and storing vehicle sensor data of at least one sensing system of a vehicle in order to detect an incident, accident and/or scam, said method comprising the steps of:
1) continuously collecting and storing a first set of vehicle sensor data for a preceding first pre-definable time period at least when the vehicle is in motion and/or when a door or trunk of the vehicle is open,
2) collecting and storing a second set of vehicle sensor data for a coming second pre-definable time period when at least one of the following occurs:
   the vehicle is brought to standstill,
   the door or trunk of the vehicle is being closed, or
   the vehicle drives away from standstill after being parked.

By the provision of the above method a more efficient collecting and storing of relevant information for detecting an incident, accident and/or scam will be accomplished. By continuously collecting information and then storing it for a preceding pre-definable time period in the above-mentioned first situations and in addition trigger logging to collect sensor data for a coming pre-definable time period when the latter mentioned situations occurs, it will be easier to detect an incident/accident and/or scam, and further it will be easier to find the most relevant information for the possible incident/accident and/or scam. In case of an attempted scam, it will be easy for the driver/owner of the vehicle to prove that he/she is not responsible for causing any damage to another road user or object. It is known that the vehicle can only cause damage to others while it is in motion or when a door or trunk is opened. Hence, since the vehicle always stores all sensing data for a pre-definable time period prior to coming to a standstill, an entire incident may be stored as long as the vehicle is brought to a standstill within the pre-definable time period after the incident. Still further, by the above-mentioned method, it is not only possible to detect incident/accidents and/or scams during driving of the vehicle, but also, e.g., when the vehicle is being parked, when the vehicle has been parked and when a door or trunk is being closed. Thus, by the provision of the method, more possible incidents/accidents and/or scams may be detected. Still further, by the principle of the method, less memory storage will be needed.

The expression "scam" in this document refers to a situation when someone tries to trick someone else or claim that something has happened, e.g., an accident or damage to another vehicle/object, etc., in order to, e.g., claim compensation, such as money. By the provision of the method according to the present invention it will be easier to determine and prove if someone has tried to perform a scam in order to claim compensation.

The method may further comprise collecting and storing a second set of vehicle sensor data for a coming second pre-definable time period when also the following occurs:
the at least one sensing system of the vehicle detects that the vehicle has been damaged by and/or caused damage to another vehicle or object. Thus, if the at least one sensing system detects that an incident/accident has occurred it will collect and store information for a coming specific time period. Thereby, vehicle sensor data before, during and after the incident/accident will be recorded, which information can be used to prove who was responsible for the incident/accident.

The method may further comprise the step of:
3) storing jointly as an event the stored second set of vehicle sensor data with the preceding first set of vehicle sensor data. By storing the preceding and the latter information as an event, i.e., as one package of data, it may be easier to find and access the relevant information for e.g. the driver or owner of the vehicle.

The expression "event" is in this disclosure meant as a package of data coming from at least one sensing system of the vehicle, which package of data comprises the data stored for the preceding first pre-definable time period and the data stored for the following/coming second pre-definable time period. Optionally, at least one of the first and second pre-definable time periods is less than 60, 50, 40, 35, or 30 seconds. By having a relatively short time period before and after trigger logging, it will be easier for, e.g., the driver to find the relevant information. In addition, shorter time periods may lead to a reduced need of storage memory. Furthermore, the preceding and the following time periods may be of essentially the same length, but also they may be of different lengths.

A plurality of subsequent events may be stored. Optionally, the plurality of subsequent events stored are less than 100, 90, 80, 70, 60, 50, 40, 30, 20 or 16 events. It may only be necessary to store a limited number of previous events and not all previously occurred events, thereby less memory storage may be needed. In addition, by only storing the most recent events, it may be easier for, e.g., the driver of the vehicle to find the most relevant event relating to a possible incident/accident and/or scam. Optionally, if a suspected incident and/or accident have occurred, said related vehicle sensor data may be stored as an event for an extended period of time and thereby not be overwritten by a new detected event. Furthermore, the driver/owner of the vehicle may be able to select if a specific event shall be stored for a longer time period. Still further, an event relating to the vehicle driving away from standstill may also be stored for an extended period of time since there is a higher risk that the vehicle has, e.g., been scratched while it was parked, and the driver/owner may not detect the scratch until a later point in time.

Optionally, the at least one event may be stored in any one or a combination of a memory of the vehicle, a memory of a mobile device, such as a mobile telephone, or in a memory of a network-based cloud, such as an internet-based cloud solution.

The method may further comprise:
continuously collecting and storing a first set of vehicle sensor data for a preceding first pre-definable time period also when the vehicle is standing still. Thus, by also making use of at least one sensing system of the vehicle to collect and store vehicle sensor data also when the vehicle is standing still, e.g., is parked, even more possible incidents/accidents and/or scams may be detected. For example, during parking, the vehicle may be scratched by, e.g., another vehicle or person. Thereby, by also having at least one sensing system of the vehicle activated during standstill of the vehicle more possible incidents/accidents and/or scams may be detected. Optionally, the at least one sensing system for detecting an incident, accident and/or scam when the vehicle is standing still is a low-energy consuming sensing system, such as an alarm sensing system of the vehicle, a motion detection sensing system or the like. By, e.g., collecting and storing vehicle sensor data of the vehicle's sensing system/s which already/anyhow is/are activated when the vehicle is standing still, less energy may be consumed compared to if also a more energy-consuming vehicle sensing system would be activated, such as for example a camera system.

Optionally, a camera sensing system of the vehicle may be activated if/when the alarm system of the vehicle is activated. Thereby the camera system may be able to detect the possible incident occurring on or nearby the vehicle. Optionally, the driver/owner of the vehicle may be notified when the alarm system is activated, e.g., via his/her mobile telephone, i.e., a mobile device. Thereby it may be possible to get a live view around the vehicle, e.g., if the camera system also is activated, in order to detect the possible incident on or nearby the vehicle.

According to the invention, the vehicle is equipped with a camera sensing system, and the camera/s may be activated when it is detected that an object or another vehicle is approaching the car. The activation of the camera/s can for example be done if an ultrasonic sensing system detects that an object is close to the vehicle and/or is moving.

Optionally, the at least one sensing system of the vehicle may be an integrated sensing system of the vehicle and not a sensing system which has been mounted thereon afterwards, such as a so called dashcam. An integrated sensing system may be defined as a sensing system that was mounted on and/or integrated into the vehicle during manufacturing of the vehicle and before the vehicle left the factory. Thus, using an already existing sensing system of the vehicle is more cost efficient instead of afterwards mounting on an additional sensing system. Furthermore, already integrated sensing systems of the vehicle may provide an improved precision compared to sensing systems which are mounted onto the vehicle later on. Still further, an integrated vehicle sensing system may be specifically adapted to the vehicle's design, needs etc., which may further improve the sensing performance.

Optionally, when the vehicle is an electrical vehicle, such as a pure electrical or a plug-in hybrid vehicle, the method may further comprise:

continuously collecting and storing a first set of vehicle sensor data for a preceding first pre-definable time period also when the vehicle is connected to a charging station. Thus, when the vehicle is connected to a charging station it will have access to electrical energy, which energy can be used to run at least one sensing system of the vehicle for collecting and storing vehicle sensor data.

Optionally, the vehicle sensor data may be collected by at least one sensing system that is adapted to detect an incident or an accident of the vehicle, or which is adapted to detect a presence of an object or another vehicle in the vicinity of the vehicle, such as:

a 360 degrees sensor system of the vehicle,
a camera or a plurality of cameras of the vehicle,
an ultrasonic sensing system of the vehicle,
a radar sensing system of the vehicle,
a motion sensing system of the vehicle,
an optical sensing system of the vehicle,
an acoustic sensing system of the vehicle, and
a LIDAR, Light Detection And Ranging, sensing system of the vehicle.

By a 360 degrees sensor system of the vehicle is meant a sensor system that can detect incidents/accidents and/or scams all around the vehicle, i.e., 360 degrees around the vehicle. Optionally, such a sensor system may be a camera system comprising several cameras, where the images from each camera are compiled into one image representing a view 360 degrees around the vehicle. A 360 degrees sensor system is for example advantageous that it can in detect incidents/accidents and/or scams all around the vehicle, and not only on one side of the vehicle. Optionally, the at least one sensing system may be arranged such that it can determine a distance and position/location of surrounding vehicles and/or objects. Furthermore, the at least one sensing system may be utilized to determine for how long the surrounding vehicles and/or objects have been, e.g., parked at a specific spot.

Optionally, when the vehicle sensor data comprises image information, the method may further comprise the step of identifying an object or another vehicle in the vicinity of the vehicle by an image recognition algorithm. Furthermore, the identified object may be a license plate of another vehicle. Still further, the license plate information may be arranged to be stored in relation to an event which the other vehicle was part of. Thereby it may be easier to detect and also trace who was responsible for the possible incident/accident and/or scam.

Optionally, the method may at least partly be implemented in any one of the vehicle's computational units, comprising at least one processor unit and a memory storage unit.

According to the second aspect thereof, the above-mentioned and other objects are at least partly achieved by a system for collecting and storing vehicle sensor data of a vehicle in order to detect an incident, accident and/or scam, the system comprising, at least one sensing system,
at least one processing unit and memory unit for continuously collecting and storing a first set of vehicle sensor data from the at least one sensing system for a preceding first pre-definable time period at least when the vehicle is in motion and/or when a door or trunk of the vehicle is open, and
at least one processing unit and memory unit for collecting and storing a second set of vehicle sensor data from the at least one sensing system for a coming second pre-definable time period when at least one of the following occurs:
the vehicle is brought to standstill,
the door or trunk of the vehicle is being closed, or
the vehicle drives away from standstill after being parked.

The advantages of the second aspect of the invention are largely analogous to the advantages of the first aspect of the invention and vice versa. It shall also be noted that all embodiments of the second aspect of the invention are applicable to all embodiments of the first aspect of the invention and vice versa.

The system may comprise at least one processing unit and memory unit for collecting and storing a second set of vehicle sensor data from the at least one sensing system for a coming second pre-definable time period also when the at least one sensing system of the vehicle detects that the vehicle has been damaged by and/or caused damage to another vehicle or object.

The system may further comprise a storage medium for storing jointly a set of sensor data as an event comprising the stored second set of vehicle sensor data with the preceding first set of vehicle sensor data.

Optionally, the at least one processing unit and memory unit for collecting and storing vehicle sensor data of the system may be a computational unit, such as a processor unit, computer, etc., and a memory storage unit. Furthermore, the computational unit and the memory storage unit may at least be part of one of the vehicle, an external device, such as a mobile device, smartphone, etc. or the like.

The system may further comprise a display for displaying the event to a driver/owner of the vehicle. Still further, the display may be any one of a display of the vehicle or a display of a mobile device, such as a mobile telephone. It is advantageous if e.g. the driver of the vehicle is able to quickly and easily retrieve the information that is relevant in order to, e.g., understand who was at fault in the possible incident/accident and/or scam. For example, if the driver of the vehicle can retrieve the information by looking at a smartphone display directly after the incident/accident has occurred, he/she can then use this information to, e.g., settle a dispute with a driver of another vehicle, a pedestrian or the like. Optionally, the stored event, or a plurality of stored subsequent events, may be stored in a smartphone app, i.e., smartphone application. Thereby the information is easily accessible to, e.g., the driver of the vehicle. Throughout this document it is often referred to the driver of the vehicle as an example of a person that can access the information. However, it shall be noted that the relevant information need not necessarily be accessible to the driver of the vehicle only, but could likewise be accessible also to other people and/or systems. In one example, the information may be used by an insurance company to thereby more easily determine who was at fault in a possible incident/accident and/or scam.

Optionally, the at least one sensing system may comprise a camera or a plurality of cameras. Still further, the system may further comprise an image recognition means which is arranged to identify an object or another vehicle in the vicinity of the vehicle. For example, the system may be arranged such that it may recognize a license plate of another vehicle. Thereby it may be easier to detect who was involved and responsible in a possible incident/accident and/or scam. Optionally, the license plate information may be arranged to be stored in relation to an event which the other vehicle was part of. Thereby, with the associated license plate information, it will be easier to find out who was involved in a specific incident/accident and/or scam.

The system may be a vehicle system. Furthermore, the system may be any one of a passenger car system, a commercial vehicle system, a bus system. Still further, the system may be a road-vehicle system.

According to the third aspect thereof, the above-mentioned and other objects are at least partly achieved by a computer-readable storage medium storing a program which causes a computer to execute a method according to any one of the embodiments of the first aspect of the invention. The advantages of the third aspect of the invention are largely analogous to the advantages of the first and second aspects of the invention and vice versa. It shall also be noted that all embodiments of the third aspect of the invention are applicable to all embodiments of the first and second aspects of the invention and vice versa. The computer-readable storage medium may be one of a removable nonvolatile random access memory, a hard disk drive, a floppy disk, a CD-ROM, a DVD-ROM, a USB memory, an SD memory card, or a similar computer readable storage medium known in the art.

According to the fourth aspect thereof, the above-mentioned and other objects are at least partly achieved by a computer program product comprising a computer readable medium having stored thereon computer program means for collecting and storing vehicle sensor data of at least one sensing system of a vehicle in order to detect an incident, an accident and/or a scam, wherein the computer program product comprises:
  code for continuously collecting and storing a first set of vehicle sensor data for a preceding first pre-definable time period at least when the vehicle is in motion and/or when a door or trunk of the vehicle is open, and
  code for collecting and storing a second set of vehicle sensor data for a coming second pre-definable time period when at least one of the following occurs:
  the vehicle is brought to standstill,
  the door or trunk of the vehicle is being closed, or
  the vehicle drives away from standstill after being parked.

The advantages of the fourth aspect of the invention are largely analogous to the advantages of the first, second and third aspects of the invention and vice versa. It shall also be noted that all embodiments of the fourth aspect of the invention are applicable to all embodiments of the first, second and third aspects of the invention and vice versa.

The computer program product may further comprise:
  code for collecting and storing a second set of vehicle sensor data for a coming second pre-definable time period also when the at least one sensing system of the vehicle detects that the vehicle has been damaged by and/or caused damage to another vehicle or object.

BRIEF DESCRIPTION OF DRAWINGS

Exemplifying and preferred embodiments of the present invention will now be described more in detail, with reference to the accompanying drawings, wherein.

Figure 1:
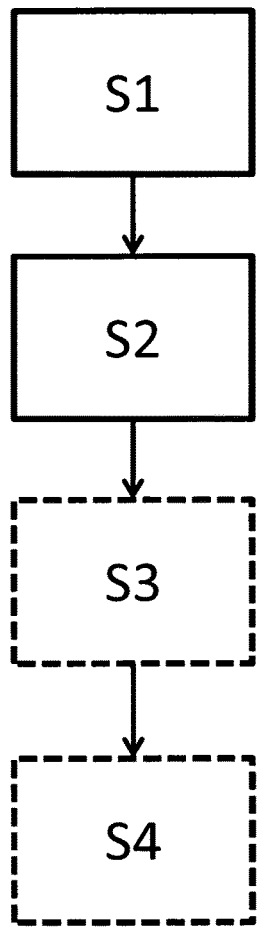
FIG. 1 shows an embodiment of a method according to the first aspect of the invention.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout.

DETAILED DESCRIPTION OF THE INVENTION

FIG. 1 illustrates a method according to an embodiment of the present invention. A method is shown for collecting and storing vehicle sensor data of at least one sensing system 2 of a vehicle 1 in order to detect an incident, accident and/or scam, said method comprising the following steps:
  1) continuously collecting and storing a first set of vehicle sensor data for a preceding first pre-definable time period at least when the vehicle is in motion and/or when a door 10 or trunk of the vehicle is open. The pre-definable first time period is in this embodiment about 30 seconds, but it could also be other time periods as described herein. Thus, the method continuously collects and then stores vehicle sensor data for the last 30 seconds when the vehicle 1 is in motion and/or when a door or trunk of the vehicle 1 is open. The method may, as described above, also collect vehicle sensor data when the vehicle 1 is standing still and/or when the vehicle 1, if an electrical vehicle, is connected to a charging station. Optionally, the method may collect and store vehicle sensor data when the vehicle's 1 power unit, e.g. combustion and/or electrical power unit, is activated. Thereby, energy will be generated that can be used for running the sensing system. In addition, a battery of the vehicle may be running the at least one sensing system. Furthermore, the method comprises the following additional step:
  2) collecting and storing a second set of vehicle sensor data for a coming second pre-definable time period when at least one of the following occurs:
  the vehicle is brought to standstill.
  the door or trunk of the vehicle is being closed, or
  the vehicle drives away from standstill after being parked.

Figure 3:
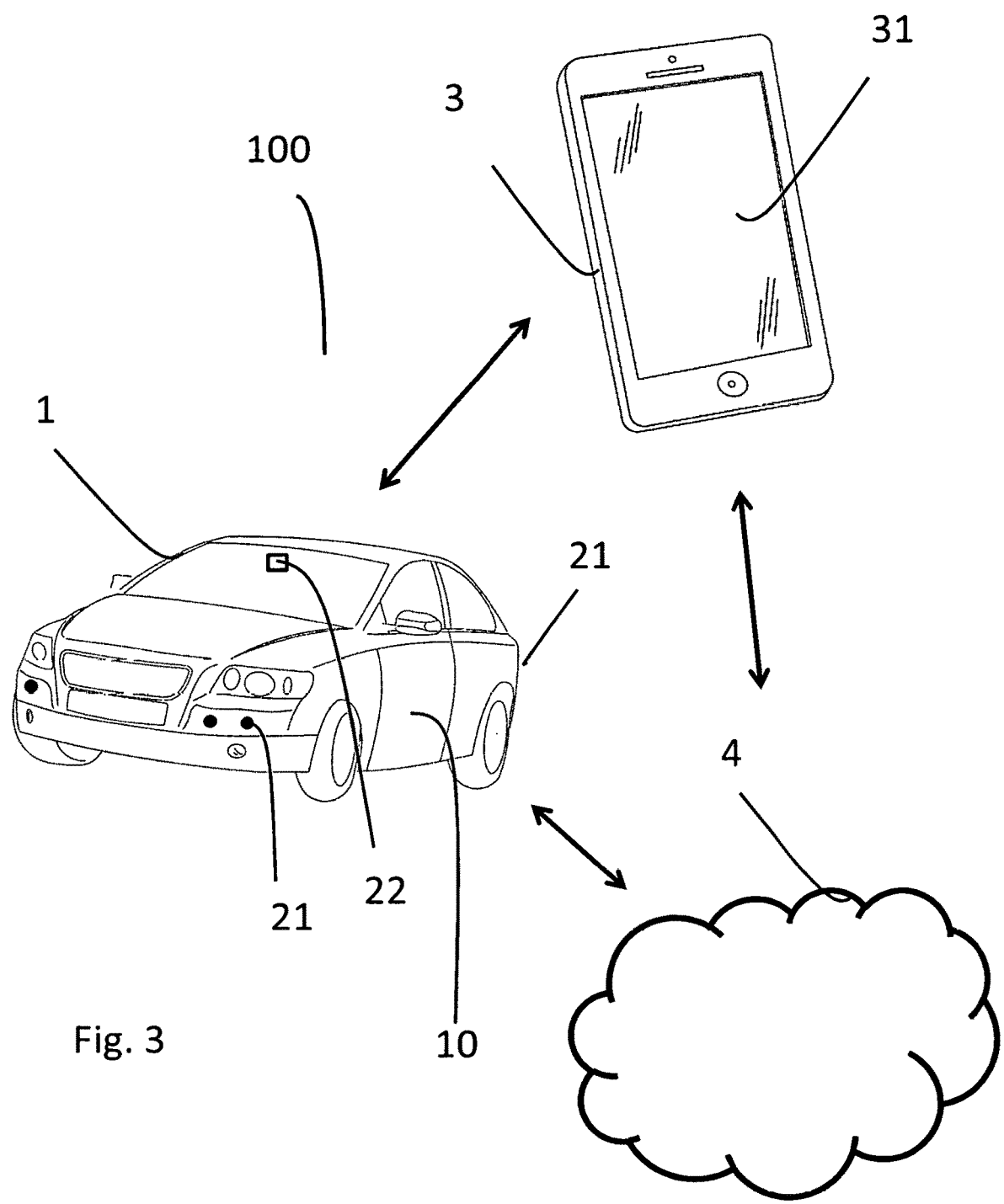
FIG. 3 shows a system and method according to another embodiment of the present invention.

The pre-definable second time period is in this embodiment also about 30 seconds, but it could also be other time periods as for instance described herein. Thus, the method will collect and store vehicle sensor data for a preceding 30 seconds and for a coming/following 30 seconds, i.e., 30+30 seconds. In the following step, S3, the first set of vehicle sensor data, i.e., the preceding 30 seconds, is stored jointly with the following second set of vehicle sensor data, i.e., the following 30 seconds, as an event. The figure illustrates steps S3 and S4 as boxes with dashed lines, meaning that said steps are optional steps of the method. The stored event may then be displayed, e.g., in the vehicle's own display inside the vehicle or alternatively in a display of a smartphone, as can be seen in FIG. 3. In step S4, a plurality of subsequent events are stored, such as for example 15 events. If the data stored in the event is image data from the camera system, the event may be displayed by showing a film sequence of 30+30 seconds, whereby the driver can recognize what has happened, e.g., that the vehicle has been scratched, or that there was no accident but instead a scam was performed. Additionally, the event may comprise additional information from other sensing systems of the vehicle. For example, in addition to the film sequence, further information such as if someone has scratched the vehicle, which, e.g., has been recognized by acoustic sensors of the vehicle, can be stored in the event and displayed to the driver. This can for example be displayed to the driver in that there is a symbol indicating that the vehicle sensing system has recognized that someone/something has touched the vehicle. Additionally, in order to show that a scam has been performed, another symbol may be displayed to the driver indicating that the sensing system/s of the vehicle has/have not recognized any contact to the vehicle.

Figure 2:
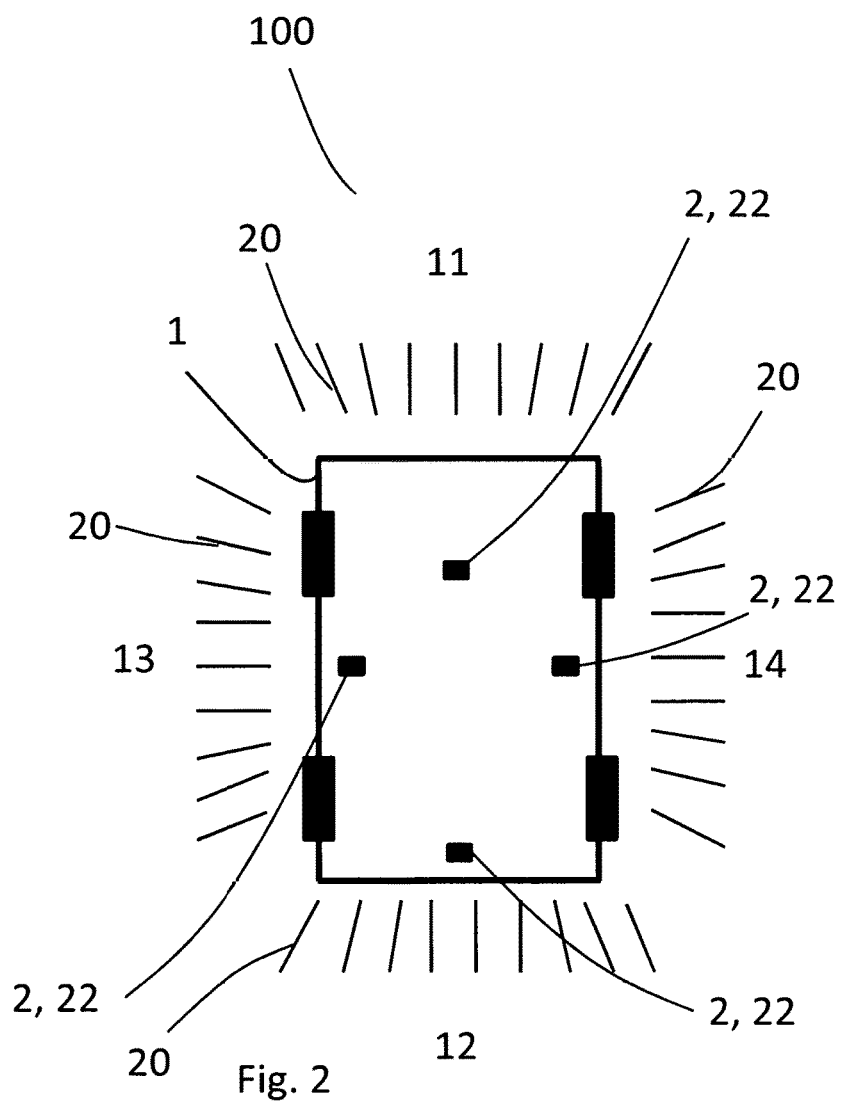
FIG. 2 shows a vehicle comprising a system and method according an embodiment of the present invention.

Now turning to FIG. 2, a schematic illustration of a vehicle 1 as seen from above is shown. The vehicle presents a front side 11, a rear side 12, a left-hand side 13 and a right-hand side 14. The vehicle comprises at least parts of a system 100 and method according to an embodiment of the present invention. The vehicle 1 comprises a vehicle sensing system 2 that can detect incidents/accidents and/or scams around the vehicle, i.e., 360 degrees around the vehicle. In this embodiment, the sensing system 2 is a camera system 22 of the vehicle 1 that can take images 360 degrees around the vehicle and then compile the images into one image representing all the images around the vehicle 1. The lines outside the sides of the vehicle in the figure represent the image field 20, i.e. the direction/area where the image is retrieved, of the cameras 22 of the sensing system 2. The camera system 22 is active at least when the vehicle is in motion and/or when a door or trunk is open and thereby the system of the present invention continuously collects and then stores a first set of image information for the preceding 30 seconds. Of course, as described herein, also other time periods are applicable. Subsequently, when at least one of the following occurs, i.e.:

the vehicle is brought to standstill,
the door or trunk of the vehicle is being closed, or
the vehicle drives away from standstill after being parked, the system 100 of the present invention collects and stores a second set of image information for the coming/following 30 seconds. This data is then stored jointly, either in a memory storage of the vehicle or outside the vehicle, as an event. A plurality of subsequent events may be stored, and the events may then be displayed to e.g. the driver of the vehicle via the vehicle's own display or via a smartphone display 31, see FIG. 3. Optionally, an alert/notification may be sent to the smartphone 3, i.e., a mobile device, when the at least one sensing system 2 has detected an incident/accident. As also described hereinabove, the system of the present invention may collect and store vehicle sensor data also when the vehicle is standing still and/or is connected to a charging station. Furthermore, the subsequent step of collecting and storing vehicle sensor data for a coming pre-definable time period may also be performed when the sensing system 2 detects that an incident/accident has occurred. The incident/accident detection may for example be made by the camera system 22 of the vehicle 1 that may recognize that something, another vehicle or object, has touched or crashed into the vehicle 1. Optionally, the camera system 22 of the vehicle may detect that a person has scratched the vehicle. As described herein, also other sensing systems may also be used for detecting possible incidents/accidents and/or scams, such as an ultrasonic sensing system, an acoustic sensing system, a motion sensing system etc. Optionally, the vehicle 1 may also be an autonomous vehicle that does not require a driver.

In FIG. 3, an illustration of a vehicle 1, a smartphone 3 and an internet-based cloud 4 is shown. The figure illustrates an implementation of a system 100 and method according to an embodiment of the present invention. The vehicle 1 comprises at least one sensing system for detecting an incident/accident and/or scam. In this embodiment, the system and method uses two sensing systems of the vehicle, namely the front and rear parking sensors 21, and the camera system 22 of the vehicle 1, which is integrated into the front window of the vehicle 1. The camera system 22 may of course also comprise cameras that can retrieve image information from the sides and from the rear of the vehicle 1. The system 100 of the present invention collects and then stores a first set of vehicle sensor data for about the last 30 seconds when the vehicle is in motion and/or when a door 10 or trunk of the vehicle 1 is open. Subsequently, when at least one of the following occurs, i.e.:

the vehicle 1 is brought to standstill,
the door 10 or trunk of the vehicle 1 is being closed, or
the vehicle 1 drives away from standstill after being parked, the system 100 further collects and stores a second set of information, comprising information from the parking sensors 21 and/or from the cameras 22, for the coming/following 30 seconds. This data, the preceding 30 seconds and the coming 30 seconds, is then stored jointly as an event. The event, or a plurality of subsequent events, may be stored in a memory of the vehicle 1, a memory of the smartphone 3, in a cloud-based 4 memory, or in a combination thereof. The event, or the plurality of events, may then be displayed to, e.g., a driver or owner of the vehicle 1 on the smartphone display 31 or in the vehicle's integrated display. Thereby the event can be quickly and easily retrieved, and therefore a possible conflict with a driver of another vehicle or a pedestrian can be easily resolved. The double-arrows between the vehicle 1, the smartphone 3 and the internet-based cloud 4 illustrates that the information can be sent in any direction between the vehicle 1, the smartphone 3 and the internet-based cloud 4. The communication between the vehicle 1, the smartphone 3 and the internet-based cloud 4 is preferably performed via wireless transmission, such as via Bluetooth, mobile telecommunication, e.g., 3G, 4G, 5G, or the like.

The invention is not limited to the embodiments described herein. It would be evident for the skilled person that other embodiments and modifications to the embodiments specified hereinabove are also possible within the scope of the claims. As used herein, the singular forms "a", "an" and "the" are intended to include the plural forms as well, unless the context clearly indicates otherwise.

What is claimed is:

1. A method for collecting and storing vehicle sensor data by at least one sensing system of a vehicle in order to detect an incident, accident and/or scam, wherein the at least one sensing system comprises a camera sensing system comprising a camera or a plurality of cameras of the vehicle, said method comprising the steps of:
   1) continuously collecting and storing a first set of vehicle sensor data for a preceding first pre-definable time period responsive to a first triggering event comprising at least when the vehicle is in motion and/or when a door or trunk of the vehicle is open,
   2) collecting and storing a second set of vehicle sensor data for a coming second pre-definable time period responsive to a second triggering event comprising when at least one of the following occurs:

the vehicle is brought to standstill, the door or trunk of the vehicle is being closed, or the vehicle drives away from standstill after being parked, wherein the first pre-definable time period is immediately prior to the second pre-definable time period, and wherein, for collecting and storing both the first set of vehicle sensor data and the second set of vehicle sensor data, the camera or the plurality of cameras is/are activated when it is detected that an object or another vehicle is approaching the vehicle.

2. The method according to claim 1, wherein the method further comprises the step of:

3) storing jointly as an event the stored second set of vehicle sensor data with the preceding first set of vehicle sensor data.

3. The method according to claim 2, wherein a plurality of subsequent events are stored.

4. The method according to claim 1, wherein the method further comprises:

continuously collecting and storing a first set of vehicle sensor data for a preceding first pre-definable time period also when the vehicle is standing still.

5. The method according to claim 1, wherein the vehicle is an electrical vehicle, such as a pure electrical or a plug-in hybrid vehicle, wherein the method further comprises:

continuously collecting and storing a first set of vehicle sensor data for a preceding first pre-definable time period also when the vehicle is connected to a charging station.

6. The method according to claim 1, wherein the vehicle sensor data is collected by the at least one sensing system that is adapted to detect an incident or an accident of the vehicle, or which is adapted to detect a presence of an object or another vehicle in the vicinity of the vehicle, the at least one sensing system comprising one or more of:

a 360 degrees sensor system of the vehicle, an ultrasonic sensing system of the vehicle, a radar sensing system of the vehicle, a motion sensing system of the vehicle, an optical sensing system of the vehicle, an acoustic sensing system of the vehicle, or a LIDAR sensing system of the vehicle.

7. A non-transitory computer-readable medium storing a program which causes a computer to execute a method according to claim 1.

8. A system for collecting and storing vehicle sensor data of a vehicle in order to detect an incident, accident and/or scam, the system comprising:

at least one sensing system, wherein the at least one sensing system comprises a camera sensing system comprising a camera or a plurality of cameras of the vehicle, at least one processing unit and memory unit for continuously collecting and storing a first set of vehicle sensor data from the at least one sensing system for a preceding first pre-definable time period responsive to a first triggering event comprising at least when the vehicle is in motion and/or when a door or trunk of the vehicle is open, and at least one processing unit and memory unit for collecting and storing a second set of vehicle sensor data from the at least one sensing system for a coming second pre-definable time period responsive to a second triggering event comprising when at least one of the following occurs:

the vehicle is brought to standstill, the door or trunk of the vehicle is being closed, or the vehicle drives away from standstill after being parked, wherein the first pre-definable time period is immediately prior to the second pre-definable time period, and wherein, for collecting and storing both the first set of vehicle sensor data and the second set of vehicle sensor data, the camera or the plurality of cameras is/are configured to be activated when it is detected that an object or another vehicle is approaching the vehicle.

9. The system according to claim 8, wherein the system further comprises a storage medium for storing jointly a set of sensor data as an event comprising the stored second set of vehicle sensor data with the preceding first set of vehicle sensor data.

10. The system according to claim 9, comprising, a display for displaying the event to a driver/owner of the vehicle.

11. The system according to claim 10, wherein the display is any one of a display of the vehicle or a display of a mobile device, such as a mobile telephone.

12. A computer program product comprising a non-transitory computer readable medium having stored thereon computer program means for collecting and storing vehicle sensor data of a sensing system of a vehicle in order to detect an incident, an accident and/or a scam, wherein the sensing system comprises a camera sensing system comprising a camera or a plurality of cameras of the vehicle, wherein the computer program product comprises:

code for continuously collecting and storing a first set of vehicle sensor data from the sensing system for a preceding first pre-definable time period responsive to a first triggering event comprising at least when the vehicle is in motion and/or when a door or trunk of the vehicle is open, and code for collecting and storing a second set of vehicle sensor data from the sensing system for a coming second pre-definable time period responsive to a second triggering event comprising when at least one of the following occurs:

the vehicle is brought to standstill, the door or trunk of the vehicle is being closed, or the vehicle drives away from standstill after being parked, wherein the computer program product further comprises, code for activating the camera or the plurality of cameras, for collecting and storing both the first set of vehicle sensor data and the second set of vehicle sensor data, when it is detected that an object or another vehicle is approaching the vehicle, wherein the first pre-definable time period is immediately prior to the second pre-definable time period.

* * * * *